Figure 1:
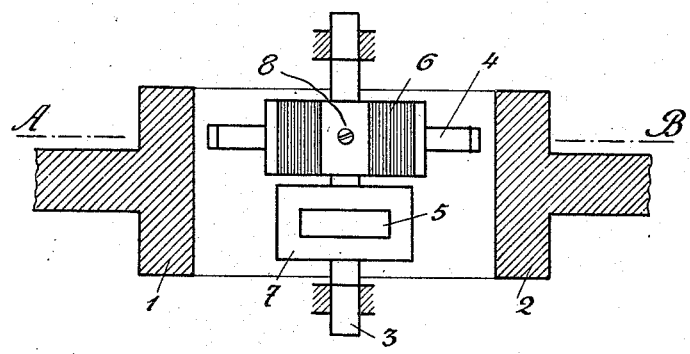

Nov. 1, 1927.

F. R. WASSERKAMPF

INDICATOR

Filed April 17, 1924

1,647,894

Inventor
Friedrich Rudolf Wasserkampf
by Knight Bros
attorneys

Patented Nov. 1, 1927.

1,647,894

UNITED STATES PATENT OFFICE.

FRIEDRICH RUDOLF WASSERKAMPF, OF KIEL, GERMANY, ASSIGNOR TO THE FIRM: NEUFELDT & KUHNKE, BETRIEBSGESELLSCHAFT, M. B. H., OF KIEL, GERMANY.

INDICATOR.

Application filed April 17, 1924, Serial No. 707,307, and in Germany April 18, 1923.

This invention relates to a device for transmitting motions to a distance by electricity and refers more particularly to indicators operated from a distance. In one type of indicator of this kind there are generally two apparatus of similar construction one of which is used as a transmitter while the other acts as a receiver. An alternating current transmitter or receiver of this kind generally comprises two magnetic poles placed opposite each other which are energized by alternating current. Between the poles are arranged a plurality of coils arranged crosswise with respect to each other and in which different electromotive forces are induced according to their angular positions with respect to said poles. The coils of the transmitter and receiver are connected to each other so that the electromotive forces generated in the same counterbalance each other when the positions of the coils in their magnetic fields correspond.

In order to increase the magnetic flux which traverses the coils, it has been proposed to wind the coils on to a cylindrical iron core which rotates between the fixed poles. Since in such an arrangement the wires of the coils are located between the fixed pole faces and the iron armature, the distance between the armature core and the pole faces is quite large and accordingly entails losses in energy.

A further disadvantage of such an arrangement is that the equalizing of the individual armature coils against each other is very difficult if not impossible, because the coils are wound on top of each other in the central portion of the armature so that, for instance, no adjustment can be made on the lower-most coils after the armature has been wound. On the other hand in devices of this character it has been found that in a great many instances the coils which are made apparently quite uniform must be subsequently readjusted relatively to each other in numbers of turns after they have been wound on the armature.

The purpose of the present invention is a remedy of these defects. In order to increase the torque of such armatures to the best possible value, the armature iron is formed so that it penetrates the coils such that its total length in the direction of the coil axis is greater than the length of the coil wound on it. In this manner, the effect is obtained, with the armature iron extending close up to the periphery of the pole shoes, that the air gap between these pole shoes and the armature may be maintained very small with the result that the path of the lines of force extends almost entirely through iron, except for the very small air gaps. This idea may be reduced to practice for instance, by arranging between the fixed poles a plurality of iron bars on a common shaft, these bars crossing each other at equal angles and by spacing the bars apart at suitable adjustable distances so that these bars rotate in different planes. Each of these bars carries one or several coils, the coils being of such length that the armature bars protrude through them at both ends. By thus separately arranging the several coils of which the armature is composed the further advantage is obtained that even after the entire armature has been wound, the individual coils may still be equalized in number of turns relatively to each other in order to obtain the desired electrical uniformity of the armature. In order not to forego the advantage—when the armature coils are thus separated—of maintaining the torque, which effects the angular adjustment of the armature during the operation, independent of the resting position in which the coils may be at the time and in order to make this torque dependent only upon the difference between the angular positions of the transmitter and receiver armatures, it is necessary to give a particular form to the armature and to the fixed pole faces. This may be accomplished for instance, by giving to the faces of the armature bars and of the fixed poles, a curvature such that the air gap between the pole faces and the ends of each armature bar, when in central axial alinement with the pole axis, increases in length towards the ends of the pole faces.

Figure 2:
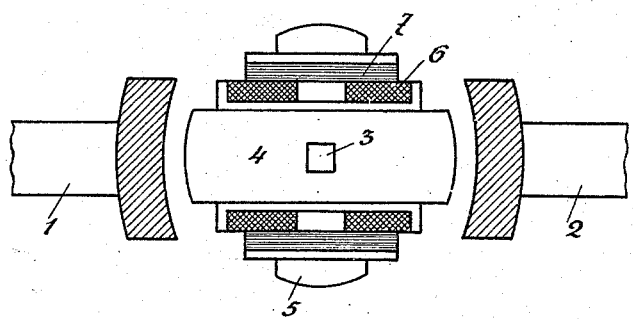

The invention is illustrated in the drawing in which Fig. 1 is a vertical section through the poles and armature of a transmitter or receiver in accordance with the invention and Fig. 2 is a horizontal section on the line A—B of Fig. 1.

1 and 2 are two magnet poles with their pole faces directed towards each other. Revolubly mounted between the poles is a shaft 3 whose middle portion has a square cross section. 4 and 5 are two iron armature bars which extend at right angles to each other and carry coils 6 and 7 respectively. These bars are spaced apart on the shaft a suitable distance so that they rotate in different planes, which distance may be fixed by any suitable means, for instance by a set screw 8. The length of each bar is such that it protrudes at both ends beyond the coil or coils wound on it, so that these bar ends can pass the field poles within the closest possible proximity. The faces of the poles 1 and 2 have individually a cylindrical curvature but this curvature is that of a cylinder whose diameter is greater than the central distance between the pole faces. By this configuration of the poles the air gap between the pole shoes and the armature bars is widened towards the ends of the pole shoes as pointed out hereinbefore and thus the independence of the torque from the momentary coil position aforementioned is aided.

From the foregoing description it will be seen that the armature is exceedingly simple in construction and that equalization of the coils with respect to each other by winding on or off a few turns can easily be effected after the armature is finished. Further equalization can be effected by slightly varying the spacing of the iron armatures on the shaft and then fixing the adjusted distance by set screw 8.

Instead of making the curvature of the pole faces less than the curvature of a circle of a diameter equal to the central distance between the poles, substantially the same effect can be obtained by making the curvature of the end faces of the armature bars greater than that of a circle whose diameter is equal to the central length of the bar. This form would have exactly the same appearance as that shown in Fig. 2 and separate illustration has therefore been omitted as obvious.

The scope of the invention is not limited to the use of two iron armature bars; for three armature bars angularly displaced by 60 degrees, or more bars displaced with respect to each other by equal angles may be employed. Furthermore, by the term "indicator" as used in the claims I intend to include the transmitting element of the system as well as the receiving element, inasmuch as each element individually comprises a similar structure so far as the present invention is concerned.

I claim:

1. An indicator adapted to be operated from a distance having two magnet pole faces opposing each other and an armature rotatably disposed therebetween, said armature consisting of a shaft, a plurality of iron bars disposed thereon to rotate in different planes and crossing each other at equal angles, and coils on said bars, said iron bars protruding at both ends beyond the ends of their respective coils.

2. An indicator adapted to be operated from a distance having two magnet pole faces opposing each other and an armature rotatably disposed therebetween, said armature consisting of a shaft, a plurality of iron bars disposed thereon to rotate in different planes and crossing each other at equal angles, and coils on said bars, the air gap between the pole faces and the ends of each armature bar, when in central axial alinement with the pole axis, increasing in length towards the ends of the pole faces.

3. An indicator adapted to be operated from a distance having two magnet pole faces opposing each other and an armature rotatably disposed therebetween, said armature consisting of a shaft, a plurality of iron bars disposed thereon to rotate in different planes and crossing each other at equal angles, and coils on said bars, said iron bars protruding at both ends beyond the ends of their respective coils, the air gap between the pole faces and the ends of each armature bar, when in central axial alinement with the pole axis, increasing in length towards the ends of the pole faces.

4. An indicator adapted to be operated from a distance having two magnet pole faces opposing each other and an armature rotatably disposed therebetween, said armature consisting of a shaft, a plurality of iron bars disposed thereon to rotate in different planes and crossing each other at equal angles, and coils on said bars, the pole faces of said bars having a cylindrical curvature smaller than that of a circle whose diameter is equal to the central axial distance between the pole faces.

5. An indicator adapted to be operated from a distance having two magnet pole faces opposing each other and an armature rotatably disposed therebetween, said armature consisting of a shaft, a plurality of iron bars disposed thereon to rotate in different planes and crossing each other at equal angles, and coils on said bars, said iron bars protruding at both ends beyond the ends of their respective coils, the pole faces of said bars having a cylindrical curvature smaller than that of a circle whose diameter is equal to the central axial distance between the pole faces.

6. An indicator adapted to be operated from a distance having two magnet pole faces opposing each other and an armature rotatably disposed therebetween, said armature consisting of a shaft, a plurality of iron bars disposed thereon to rotate in different planes and crossing each other at equal angles, and coils on said bars, said iron bars protruding at both ends beyond the ends of their respective coils and means for adjusting the distance between the rotary planes of said bars.

In testimony wherof I affix my signature.

FRIEDRICH RUDOLF WASSERKAMPF.